(12) United States Patent
Viswanathan

(10) Patent No.: US 10,877,473 B2
(45) Date of Patent: Dec. 29, 2020

(54) METHOD, APPARATUS AND COMPUTER PROGRAM PRODUCT FOR DIFFERENTIAL POLICY ENFORCEMENT FOR ROADWAYS

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 177 days.

(21) Appl. No.: 16/059,350

(22) Filed: Aug. 9, 2018

(65) Prior Publication Data

US 2020/0050193 A1 Feb. 13, 2020

(51) Int. Cl.
*G05D 1/00* (2006.01)
*G05D 1/02* (2020.01)
(Continued)

(52) U.S. Cl.
CPC ....... *G05D 1/0061* (2013.01); *G01C 21/3453* (2013.01); *G05D 1/0027* (2013.01); *G05D 1/0088* (2013.01); *G05D 1/0274* (2013.01); *G06F 16/29* (2019.01); *G05D 2201/0213* (2013.01)

(58) Field of Classification Search
CPC .. G05D 1/0061; G05D 1/0027; G05D 1/0088; G05D 1/0274; G05D 2201/0213; G05D 1/0055; G05D 1/0223; G06F 16/29; G01C 21/3453; G01C 21/3461; G01C 21/30; B60W 30/095; B60W 30/0953; B60W 30/0956; B60W 30/182; B60W 40/02; B60W 40/04; B60W 40/06; B60W 40/064; B60W 40/068; B60W 40/072; B60W 40/076; B60W 40/12;
(Continued)

(56) References Cited

U.S. PATENT DOCUMENTS

| 7,783,426 B2 | 8/2010 | Kato et al. |
| 9,728,084 B2 | 8/2017 | Stenneth |

(Continued)

FOREIGN PATENT DOCUMENTS

WO WO 2007/026603 A1 2/2018

OTHER PUBLICATIONS

Extended European Search Report for Application No. EP 19 19 0889 dated Dec. 20, 2019, 8 pages.
(Continued)

*Primary Examiner* — Adam R Mott
(74) *Attorney, Agent, or Firm* — Alston & Bird LLP

(57) ABSTRACT

A method, apparatus and computer program product are provided for enforcing a differential policy for autonomous vehicles along a road. In the context of a method, the may include: determining location information of a vehicle including a road segment and a direction of travel; identifying capabilities of sensors of the vehicle; determining an autonomous or semi-autonomous policy for the road segment specific to the vehicle in response to identifying the capabilities of the sensors of the vehicle; providing a first set of instructions for autonomous control in response to the capabilities of the sensors of the vehicle satisfying a first level of capability; and providing a second set of instructions for autonomous control in response to the capabilities of the sensors of the vehicle satisfying a second level of capability.

20 Claims, 4 Drawing Sheets

(51) Int. Cl.
*G01C 21/34* (2006.01)
*G06F 16/29* (2019.01)

(58) Field of Classification Search
CPC . B60W 2050/0095; B60W 2050/0096; B60W 60/0018–00188
See application file for complete search history.

(56) References Cited

U.S. PATENT DOCUMENTS

| | | |
|---|---|---|
| 9,811,085 B1 | 11/2017 | Hayes et al. |
| 10,042,359 B1 | 8/2018 | Konrardy et al. |
| 2017/0356747 A1 | 12/2017 | Iagnemma |
| 2017/0371337 A1 | 12/2017 | Ramasamy |
| 2018/0053415 A1 | 2/2018 | Krunic et al. |

OTHER PUBLICATIONS

*On the Road to Fully Self-Driving*, Waymo Safety Report [online] [retrieved Aug. 28, 2018]. Retrieved from the Internet: <URL: https://storage.googleapis.com/sdc-prod/v1/safety-report/waymo-safety-report-2017.pdf>. (dated 2017) 43 pages.

US 10,877,473 B2

METHOD, APPARATUS AND COMPUTER PROGRAM PRODUCT FOR DIFFERENTIAL POLICY ENFORCEMENT FOR ROADWAYS

TECHNOLOGICAL FIELD

An example embodiment of the present invention relates generally to enforcing policies on roadways relating to vehicle control along the roadways, and more particularly, to a method of differential policy enforcement for vehicle control along roadways between manually driven vehicles and autonomous or semi-autonomously controlled vehicles.

BACKGROUND

Maps have been used for centuries for providing route geometry and geographical information, while routes have been driven by people referencing the maps primarily for direction and orientation. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route, or general assistance to a user when no specific destination has been selected. Further, dynamic map attributes such as route traffic, route conditions, and other dynamic map-related information may be provided to enhance the digital maps and facilitate navigation and driver assistance through situational awareness. Typical digital maps and navigation systems may have copious amounts of information available, from various road network awareness to accident, construction, and other traffic-related dynamically updated data. Further, the ubiquity of available data results in a copious amount of data and information pertaining to road segments and objects that may be found within an area represented by a map. The volume of associated data may be overwhelming for mapping software or navigation systems, but may be used in ways that facilitate autonomous and semi-autonomous vehicle control.

BRIEF SUMMARY

A method, apparatus, and computer program product are therefore provided for implementing differential policies for road segments relating to vehicles traveling along the road segments. Embodiments described herein may provide an apparatus to facilitate autonomous or semi-autonomous control of a vehicle including at least one processor and at least one non-transitory memory including computer program code instructions. The computer program code instructions may be configured to, when executed, cause the apparatus to: determine location information of a vehicle including a road segment and a direction of travel; identify capabilities of sensors of the vehicle; determine an autonomous or semi-autonomous policy for the road segment specific to the vehicle in response to identifying the capabilities of the sensors of the vehicle; provide a first set of instructions for autonomous vehicle control in response to the capabilities of the sensors of the vehicle satisfying a first level of capability; and provide a second set of instructions for autonomous vehicle control in response to the capabilities of the sensors of the vehicle satisfying a second level of capability.

According to some embodiments, the first level of capability of sensors of a vehicle may be associated with a first sensor package, where the second level of capability of sensors of a vehicle may be associated with a second sensor packate. Causing the apparatus to identify capabilities of sensors of a vehicle may include causing the apparatus to identify a sensor package of the vehicle. Causing the apparatus to provide a first set of autonomous instructions may include instructions for traveling at a first speed along the road segment and causing the apparatus to provide a second set of autonomous instructions may include instructions for traveling at a second speed along the road segment, different from the first speed. The first road segment may include a first speed limit for vehicles equipped with the first sensor package, and a second speed limit different from the first speed limit for vehicles equipped with the second sensor package.

The apparatus of some embodiments may be caused to: determine at least one of a time of day or a weather condition, where causing the apparatus to determine an autonomous or semi-autonomous policy for the road segment may include causing the apparatus to determine an autonomous or semi-autonomous policy for the road segment based, at least in part, on the determined time of day or weather condition. The apparatus may be caused to determine a traffic level along the road segment in the direction of travel of the vehicle, where causing the apparatus to determine an autonomous or semi-autonomous policy for the road segment may include causing the apparatus to determine an autonomous or semi-autonomous policy for the road segment based, at least in part, on the determined traffic level along the road segment. Causing the apparatus to determine an autonomous or semi-autonomous policy for the road segment specific to the vehicle in response to identifying the capabilities of the sensors of the vehicle may include causing the apparatus to: access map data including road segment policy information; and retrieve road segment policy information associated with the road segment and the direction of travel.

Embodiments described herein may provide a computer program product including at least one non-transitory computer-readable storage medium having computer-executable program code instructions stored therein. The computer-executable program code instructions include program code instructions to: determine location information of a vehicle including a road segment and a direction of travel; identify capabilities of sensors of the vehicle; determine an autonomous or semi-autonomous policy for the road segment specific to the vehicle in response to identifying the capabilities of the sensors of the vehicle; provide a first set of instructions for autonomous control in response to the capabilities of the sensors of the vehicle satisfying a first level of capability; and provide a second set of instructions for autonomous control in response to the capabilities of the sensors of the vehicle satisfying a second level of capability.

According to some embodiments, the first level of capability of the sensors of a vehicle is associated with a first sensor package, where the second level of capability of sensors of a vehicle is associated with a second sensor package. Identifying capabilities of sensors of a vehicle may include identifying a sensor package of the vehicle. The program code instructions to provide a first set of autonomous instructions may include instructions for traveling at a first speed along the road segment and the program code instructions to provide a second set of autonomous instructions may include instructions for traveling at a second speed along the road segment, different from the first speed. The first road segment may include a first speed limit for vehicles equipped with the first sensor package and a second speed limit, different from the first speed limit, for vehicles equipped with the second sensor package.

The computer program product of some embodiments may include program code instructions to: determine at least one of a time of day or a weather condition, where the program code instructions to determine an autonomous or semi-autonomous policy for the road segment may include program code instructions to determine an autonomous or semi-autonomous policy for the road segment based, at least in part, on the determined time of day or the weather condition. Embodiments may include program code instructions to: determine a traffic level along the road segment in the direction of travel of the vehicle, where the program code instructions to determine an autonomous or semi-autonomous policy for the road segment may include program code instructions to determine an autonomous or semi-autonomous policy for the road segment based, at least in part, on the determined traffic level along the road segment. The program code instructions to determine an autonomous or semi-autonomous policy for the road segment specific to the vehicle in response to identifying the capabilities of the sensors of the vehicle may include program code instructions to: access map data including road segment policy information; and retrieve road segment policy information associated with the road segment and the direction of travel.

Embodiments described herein may provide a method including: determining location information of a vehicle including a road segment and a direction of travel; identifying capabilities of sensors of the vehicle; determining an autonomous or semi-autonomous policy for the road segment specific to the vehicle in response to identifying the capabilities of the sensors of the vehicle; providing a first set of instructions for autonomous control in response to the capabilities of the sensors of the vehicle satisfying a first level of capability; and providing a second set of instructions for autonomous control in response to the capabilities of the sensors of the vehicle satisfying a second level of capability.

According to some embodiments, the first level of capability of sensors of a vehicle is associated with a first sensor package, and the second level of capability of sensors of a vehicle is associated with a second sensor package, where identifying capabilities of the sensors of a vehicle may include identifying a sensor package of the vehicle. Providing a first set of autonomous instructions may include instructions for traveling at a first speed along the road segment and providing a second set of autonomous instructions may include instructions for traveling at a second speed along the road segment, different from the first speed. The first road segment may include a first speed limit for vehicles equipped with the first sensor package, and a second speed limit different from the first speed limit for vehicles equipped with the second sensor package.

Methods may include: determining at least one of a time of day or a weather condition, where determining an autonomous or semi-autonomous policy for the road segment may include determining an autonomous or semi-autonomous policy for the road segment based, at least in part, on the determined time of day or the weather condition. Methods may optionally include determining a traffic level along the road segment in the direction of travel of the vehicle. Determining an autonomous or semi-autonomous policy for the road segment may include determining an autonomous or semi-autonomous policy for the road segment based, at least in part, on the determined level of traffic of the road segment.

Embodiments described herein may provide an apparatus including: means for determining location information of a vehicle including a road segment and a direction of travel; means for identifying capabilities of sensors of the vehicle; means for determining an autonomous or semi-autonomous policy for the road segment specific to the vehicle in response to identifying the capabilities of the sensors of the vehicle; means for providing a first set of instructions for autonomous control in response to the capabilities of the sensors of the vehicle satisfying a first level of capability; and means for providing a second set of instructions for autonomous control in response to the capabilities of the sensors of the vehicle satisfying a second level of capability.

According to some embodiments, the first level of capability of sensors of a vehicle is associated with a first sensor package, and the second level of capability of sensors of a vehicle js associated with a second sensor package, where the means for identifying capabilities of the sensors of a vehicle may include means for identifying a sensor package of the vehicle. The means for providing a first set of autonomous instructions may include means for causing travel at a first speed along the road segment and the means for providing a second set of autonomous instructions may include means for causing travel at a second speed along the road segment, different from the first speed. The first road segment may include a first speed limit for vehicles equipped with the first sensor package, and a second speed limit different from the first speed limit for vehicles equipped with the second sensor package.

An example apparatus may include: means for determining at least one of a time of day or a weather condition, where the means for determining an autonomous or semi-autonomous policy for the road segment may include means for determining an autonomous or semi-autonomous policy for the road segment based, at least in part, on the determined time of day or the weather condition. An apparatus may optionally include means for determining a traffic level along the road segment in the direction of travel of the vehicle. The means for determining an autonomous or semi-autonomous policy for the road segment may include means for determining an autonomous or semi-autonomous policy for the road segment based, at least in part, on the determined level of traffic of the road segment.

BRIEF DESCRIPTION OF THE DRAWINGS

Figure 1:
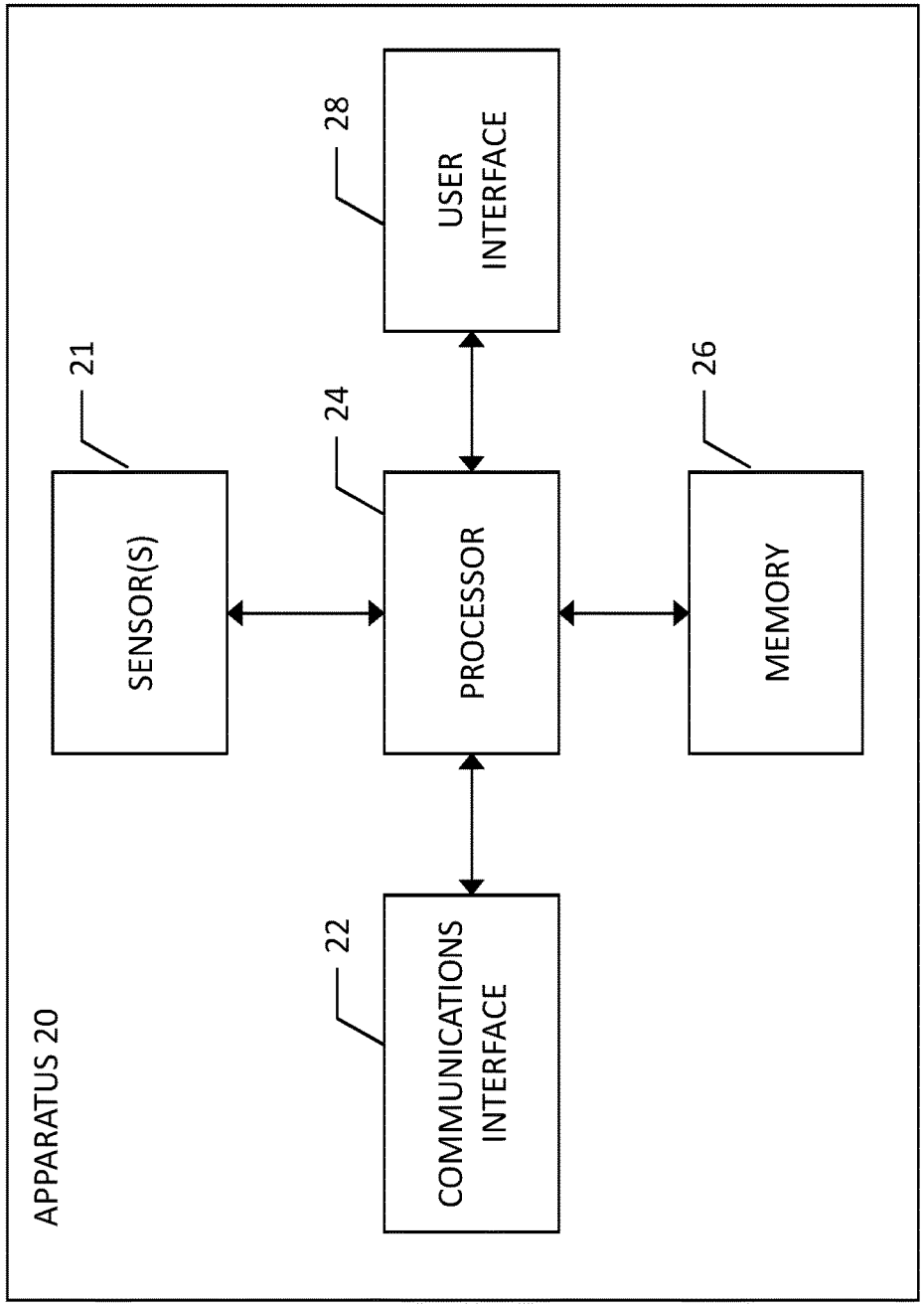
Figure 2:
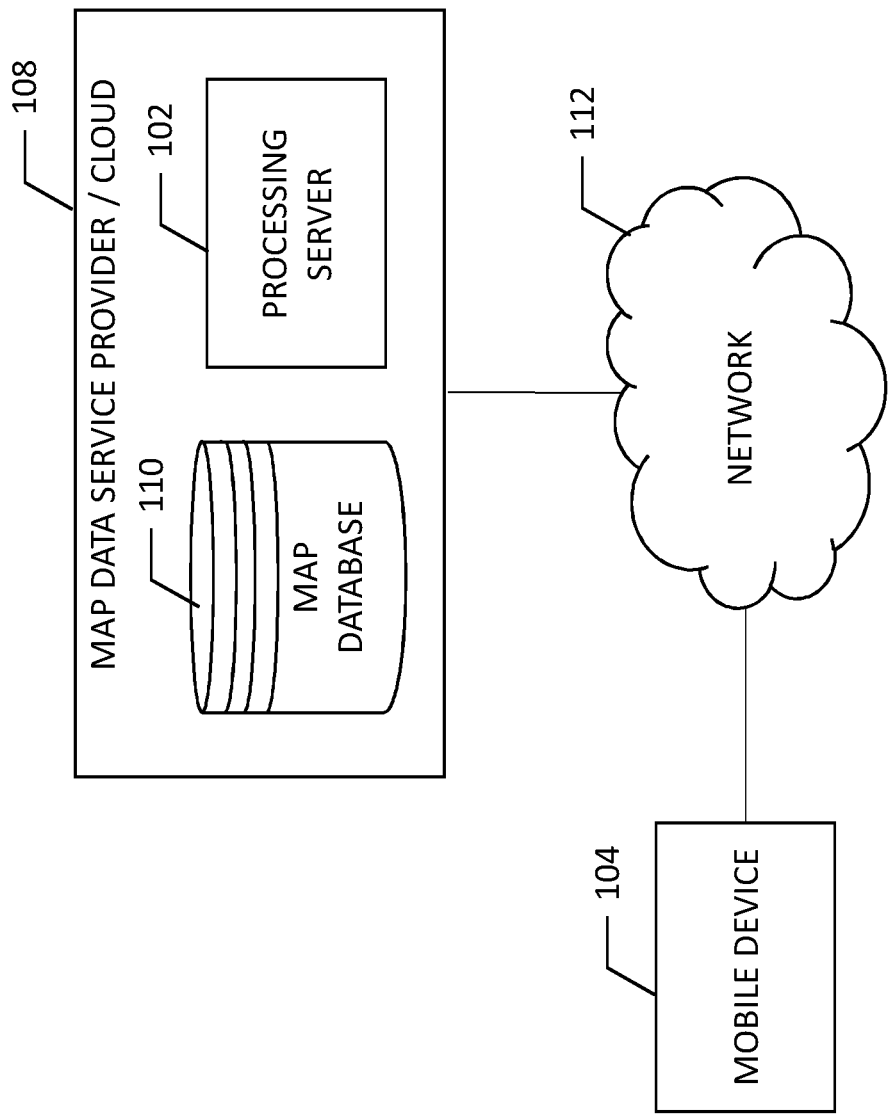
Figure 3:
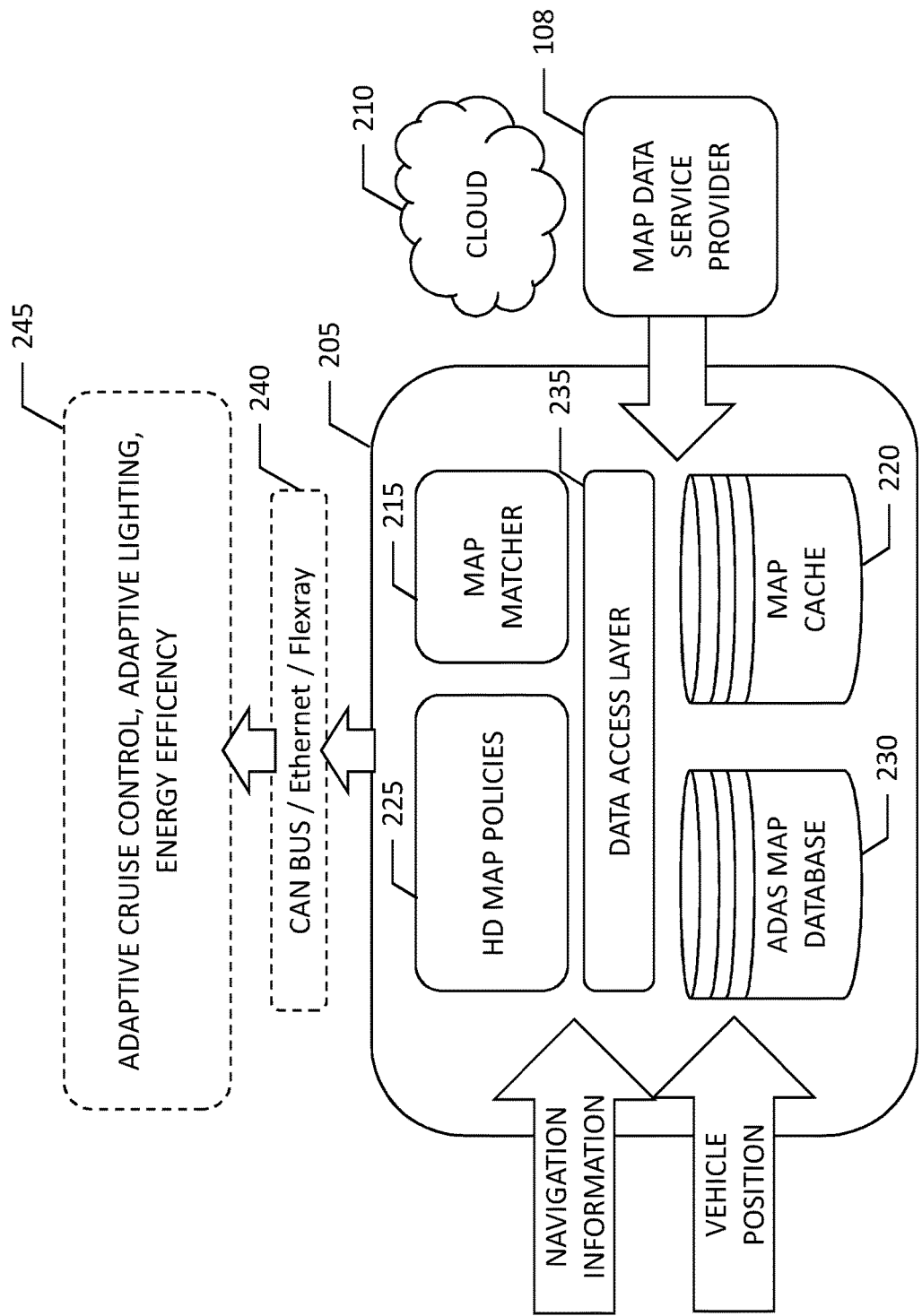
Figure 4:
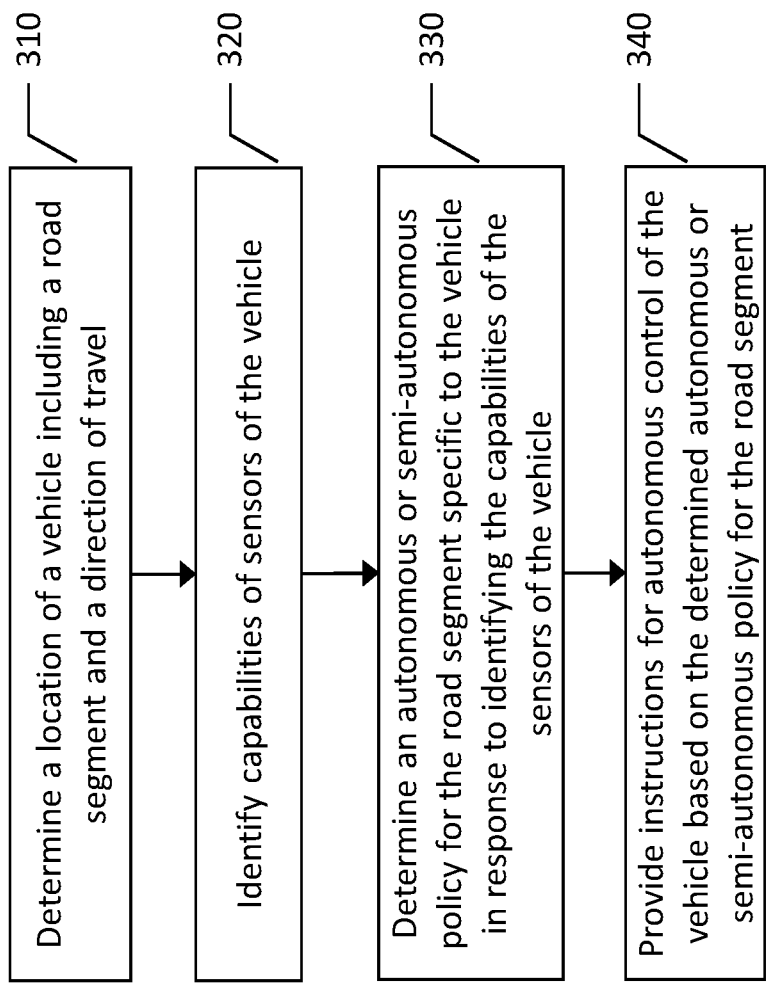

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for enforcing differential polices along road segments according to an example embodiment of the present disclosure;

FIG. 3 is another block diagram of a system for enforcing differential polices along road segments and implementing them in a vehicle according to an example embodiment of the present disclosure; and FIG. 4 is a flowchart of operations for enforcing differential policies along road segments according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for facilitating autonomous and semi-autonomous driving in an environment that shares road segments of a road network with conventional, manually driven vehicles. Autonomous vehicles leverage sensor information relating to roads to determine safe regions of a road to drive and to evaluate their surroundings as they traverse a road segment. Further, autonomous and semi-autonomous vehicles use high-definition map information to facilitate autonomous driving and to plan autonomous driving routes. These high-definition maps or HD maps are specifically designed and configured to facilitate autonomous and semi-autonomous vehicle control.

HD maps have a high precision at resolutions that may be down to several centimeters so as to identify objects proximate a road segment, features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a advanced driver assistance features which may include a navigation system user interface. For example, the computing device may be an Advanced Driver Assistance System module (ADAS) which may at least partially control autonomous or semi-autonomous features of a vehicle; however embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In a preferred embodiment the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication or may alternatively support vehicle to vehicle or vehicle to infrastructure wireless links.

The apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

Autonomous vehicles or vehicles with some level of autonomous controls provide some degree of vehicle control that was previously performed by a person driving a vehicle. Removing some or all of the responsibilities of driving from a person and automating those responsibilities require a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Autonomous and semi-autonomous vehicles may use a variety of sensors to facilitate various autonomous functions. For example, adaptive cruise control functionality that maintains a following distance from a lead vehicle, and maintains a near-constant speed when not following another vehicle, requires at least sensors that can detect a vehicle in front of the autonomous or semi-autonomous vehicle. Such a sensor may be a distance sensor such as LiDAR or other sensor having similar capabilities. Further, the autonomous or semi-autonomous vehicle must be equipped with control capabilities to facilitate braking of the vehicle and accelerating the vehicle. This sensor and control system may be a "sensor package" or level of sensor capabilities. Adaptive cruise control has become relatively common, such that a sensor package capable of adaptive cruise control may be a relatively rudimentary level of sensor capabilities relative to a vehicle that has full autonomous control.

Beyond adaptive cruise control, vehicles with more autonomy may be able to navigate roadways through lane changes, turns, stopping, starting, and generally performing all features of conventional driving that historically have been performed manually by a driver. In order to facilitate full autonomy, vehicles require a level of sensor capabilities that can identify road geometry, lane lines, other vehicles, pedestrians, objects in or proximate the roadway, signs, road anomalies (e.g., temporary construction barricades), etc. Such an advanced sensor package having a high level of sensor capabilities may be capable of full autonomous control of a vehicle in a manner that substantially replaces the driver. It is also appreciated that any degree of autonomy between no autonomy and full autonomy is also possible based on a sensor package installed in a vehicle or carried with a vehicle and a level of sensor capabilities of the sensor package.

Beyond sensors on a vehicle, autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

According to example embodiments described herein, the role of HD maps in facilitating autonomous or semi-autonomous vehicle control may be to implement a differential policy enforcement tool based on individual vehicle capabilities, specifically with regard to sensor packages and the level of sensor capabilities of a vehicle. Autonomous vehicles leverage sensor information to determine safe regions on a road in which they may drive and use HD maps to plan safe routes from the vehicle's current location to the destination. The HD map, whether stored locally on a vehicle, such as in an ADAS, or stored remotely accessible via network by the vehicle, may encode policies and restrictions such as the lane travel direction, speed limits, and other restrictions that constrain the vehicle to pre-described operation limits. Embodiments described herein implement a differential policy implementation for the map in the presence of manually, human-driven vehicles and uses the map as a policy enforcement tool.

As autonomous vehicles transition from partial to full-autonomy, the presence of manually driven vehicles with human drivers on the roads add an additional layer of complexity. In turn, the on-board sensor package and autonomous control system needs to consider human behavior as an added constraint to ensure the safety of passengers of the autonomous vehicle and other vehicles on the road. Further, the sensor suite of autonomous and semi-autonomous vehicles may need to recognize road signs that are human readable in context of the road situation. For example, a sign occluded by a tree and missed by the on-board sensor package of a vehicle will not be used to constrain the vehicle's speed as the vehicle may infer that the sign is missing. In such scenarios, the HD map may be used to enforce policy constraints on allowable speed limits. Embodiments herein employ a use case where the HD map enforces differential road policy where a set of policies and constraints for human drivers may not be equally applied to autonomous vehicles.

A differential policy set may be encoded by the HD map for autonomous and semi-autonomous vehicles, where different policies may be applied to vehicles based on their level of autonomy, which may be derived from their sensor packages and levels of sensor capabilities of the respective sensor packages. The same set of road rules apply to both autonomously driven vehicles and manually driven vehicles. However, vehicle performance and policies directed to vehicle control and performance may be varied based on a level of capabilities of a vehicle. For instance, a sharp turn may have a suggested, reduced speed limit for vehicles as presented on signs proximate the turn. However, a fully autonomous vehicle may be able to handle the turn at a higher speed than the suggested, reduced speed limit due to more advanced steering control and the ability of an autonomous vehicle to apex a turn properly due to a better understanding of the turn geometry from the HD map.

According to some embodiments, road signs as observed from a human driver's standpoint may not be applicable to an autonomously driven vehicle as the policy constraints for the autonomously driven vehicle may be encoded in the HD map. The policies encoded into the HD map may be distinct from those presented in signs to a user, as described above.

Further embodiments may encode different policies for different sensor packages and levels of capabilities of vehicles. Embodiments may also factor in weather conditions with respect to policies encoded on an HD map relative to autonomous and semi-autonomous vehicles. Vehicles having a full complement of sensors may be capable of driving at a speed higher than those that have a lower degree of sensor capability in inclement weather, where sensors of higher capability may mitigate the reduced vision available during inclement weather. Further, time of day may affect the policies encoded into an HD map. Vehicles having sensor packages that include sensors capable of functioning well at night may be able to travel at a higher speed than vehicles having sensors that rely more on light to efficiently function.

Beyond the sensor capabilities and sensor packages of a vehicle, differential policies may be encoded in an HD map based on the dynamic capabilities of a vehicle. For example, a large vehicle such as a full-sized truck may not be able to round a turn at a speed equal to that of a small car, such that a policy for the small car may enable a faster speed through the turn. Further, vehicles with high efficiency brakes, such as electric vehicles with regenerative braking which may bring a vehicle to a stop in a shorter distance than a conventional vehicle with disc or drum brakes may abide by a policy in which a following distance to a leading vehicle may be shorter as the likelihood of a rear end collision may be mitigated by the improved braking capabilities.

Vehicles of different sensor packages with different sensor capabilities may have different policies applied by the HD maps described herein. The HD maps described herein may be encoded with different policy levels based on a variety of factors, such as vehicle sensor package/sensor capabilities, whether the vehicle is in autonomous control mode or manual drive mode, the dynamic capabilities of the vehicle, the time of day or weather conditions, the traffic levels near the vehicle, etc. These differential policies may provide improved safety among vehicles on the road, particularly when there is a mix of fully autonomous vehicles, semi-autonomous vehicles, and manually driven vehicles. Further, policies that are well matched and suited to a particular vehicle may enable that vehicle to perform optimally given the conditions, thereby improving driver and passenger experience.

FIG. 3 illustrates an example embodiment of an architecture specifically configured for implementing embodiments described herein. The illustrated embodiment of FIG. 3 may be vehicle-based, where information regarding map data is provided via a map data service provider 108 and vehicle position along with navigation information is established based on data received at the vehicle. As illustrated, the architecture includes a map data service provider 108 that provides map data (e.g., HD maps and policies associated with road links within the map) to the Advanced Driver Assistance System (ADAS) 205, which may be vehicle-based or server based depending upon the application. The map data service provider may be a cloud-based 210 service. The ADAS receives navigation information and vehicle position and uses that information to map-match 215 the position to a road link on a map of the mapped network of roads stored in the map cache 220. This link or segment, along with the direction of travel, is used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). The HD map policies associated with the road segment specific to the vehicle are provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

FIG. 4 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 4 is a flowchart of a method for implementing differential policy enforcement of vehicles based on a level of sensor capability and autonomy of the respective vehicles. As shown, location information of a vehicle is determined at 310 including a road segment along which the vehicle is traveling and a direction of travel of the vehicle. Sensor capabilities of the vehicle are determined at 320. Based on the road segment along which the vehicle is traveling, an autonomous or semi-autonomous policy for the road segment is determined specific to the capabilities of the sensors of the vehicle at 330. Instructions for autonomous control of the vehicle are provided at 340 based on the determined autonomous or semi-autonomous policy determined.

In an example embodiment, an apparatus for performing the method of FIG. 4 above may comprise a processor (e.g., the processor 24) configured to perform some or each of the operations (310-340) described above. The processor may, for example, be configured to perform the operations (310-340) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-340 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. An apparatus to facilitate autonomous or semi-autonomous control of a vehicle comprising at least one processor and at least one non-transitory memory including computer program code instructions, the computer program code instructions configured to, when executed, cause the apparatus to at least:
    determine location information of a vehicle including a road segment and a direction of travel;
    identify capabilities of sensors of the vehicle;
    access map data comprising road segment policy information associated with the road segment, wherein the road segment policy information comprises predefined operational limits for the road segment associated with the map data;
    determine an autonomous or semi-autonomous policy for the road segment specific to the vehicle based on the road segment policy information and in response to identifying the capabilities of the sensors of the vehicle;
    provide a first set of instructions for autonomous control in response to the capabilities of the sensors of the vehicle satisfying a first level of capability; and
    provide a second set of instructions for autonomous control in response to the capabilities of the sensors of the vehicle satisfying a second level of capability.

2. The apparatus of claim 1, wherein the first level of capability of sensors of a vehicle is associated with a first sensor package, and wherein the second level of capability of sensors of a vehicle is associated with a second sensor package, wherein causing the apparatus to identify capabilities of sensors of a vehicle comprises causing the apparatus to identify a sensor package of the vehicle.

3. The apparatus of claim 2, wherein causing the apparatus to provide a first set of autonomous instructions comprises instructions for traveling at a first speed along the road segment and causing the apparatus to provide a second set of autonomous instructions comprises instructions for traveling at a second speed along the road segment, different from the first speed.

4. The apparatus of claim 3, wherein the first road segment comprises a first speed limit for vehicles equipped with the first sensor package, and a second speed limit, different from the first speed, for vehicles equipped with the second sensor package.

5. The apparatus of claim 1, wherein the apparatus is further caused to:
    determine at least one of a time of day or a weather condition, wherein causing the apparatus to determine an autonomous or semi-autonomous policy for the road segment comprises causing the apparatus to determine an autonomous or semi-autonomous policy for the road segment based, at least in part, on the determined time of day or the weather condition.

6. The apparatus of claim 1, wherein the apparatus is further caused to:
    determine a traffic level along the road segment in the direction of travel of the vehicle, wherein causing the apparatus to determine an autonomous or semi-autonomous policy for the road segment comprises causing the apparatus to determine an autonomous or semi-autonomous policy for the road segment based, at least in part, on the determined traffic level along the road segment.

7. The apparatus of claim 1, wherein road segment policy information associated with the road segment differs based on a degree of autonomy of the vehicle.

8. A computer program product comprising at least one non-transitory computer-readable storage medium having computer-executable program code instructions stored therein, the computer-executable program code instructions comprising program code instructions to:
    determine location information of a vehicle including a road segment and a direction of travel;
    identify capabilities of sensors of the vehicle;
    access map data comprising road segment policy information associated with the road segment, wherein the road segment policy information comprises predefined operational limits for the road segment associated with the map data;
    determine an autonomous or semi-autonomous policy for the road segment specific to the vehicle based on the road segment policy information and in response to identifying the capabilities of the sensors of the vehicle;
    provide a first set of instructions for autonomous control in response to the capabilities of the sensors of the vehicle satisfying a first level of capability; and
    provide a second set of instructions for autonomous control in response to the capabilities of the sensors of the vehicle satisfying a second level of capability.

9. The computer program product of claim 8, wherein the first level of capability of sensors of a vehicle is associated with a first sensor package, and wherein the second level of capability of sensors of a vehicle is associated with a second sensor package, wherein causing the apparatus to identify capabilities of sensors of a vehicle comprises program code instructions to identify a sensor package of the vehicle.

10. The computer program product of claim 9, wherein the program code instructions to provide a first set of autonomous instructions comprises instructions for traveling at a first speed along the road segment and the program code instructions to provide a second set of autonomous instructions comprises instructions for traveling at a second speed along the road segment, different from the first speed.

11. The computer program product of claim 10, wherein the first road segment comprises a first speed limit for vehicles equipped with the first sensor package, and a second speed limit, different from the first speed, for vehicles equipped with the second sensor package.

12. The computer program product of claim 8, further comprising program code instructions to:
    determine at least one of a time of day or a weather condition, wherein the program code instructions to determine an autonomous or semi-autonomous policy for the road segment comprises program code instructions to determine an autonomous or semi-autonomous policy for the road segment based, at least in part, on the determined time of day or the weather condition.

13. The computer program product of claim 8, further comprising program code instructions to:
    determine a traffic level along the road segment in the direction of travel of the vehicle, wherein the program code instructions to determine an autonomous or semi-autonomous policy for the road segment comprises program code instructions to determine an autonomous or semi-autonomous policy for the road segment based, at least in part, on the determined traffic level along the road segment.

14. A method comprising:
    determining location information of a vehicle including a road segment and a direction of travel;

identifying capabilities of sensors of the vehicle;

accessing map data comprising road segment policy information associated with the road segment, wherein the road segment policy information comprises predefined operational limits for the road segment associated with the map data;

determining an autonomous or semi-autonomous policy for the road segment specific to the vehicle based on the road segment policy information and in response to identifying the capabilities of the sensors of the vehicle;

providing a first set of instructions for autonomous control in response to the capabilities of the sensors of the vehicle satisfying a first level of capability; and providing a second set of instructions for autonomous control in response to the capabilities of the sensors of the vehicle satisfying a second level of capability.

15. The method of claim 14, wherein the first level of capability of sensors of a vehicle is associated with a first sensor package, and wherein the second level of capability of sensors of a vehicle is associated with a second sensor package, wherein identifying capabilities of sensors of a vehicle comprises identifying a sensor package of the vehicle.

16. The method of claim 15, wherein providing a first set of autonomous instructions comprises instructions for traveling at a first speed along the road segment and providing a second set of autonomous instructions comprises instructions for traveling at a second speed along the road segment, different from the first speed.

17. The method of claim 16, wherein the first road segment comprises a first speed limit for vehicles equipped with the first sensor package, and a second speed limit, different from the first speed, for vehicles equipped with the second sensor package.

18. The method of claim 14, further comprising:

determining at least one of a time of day or a weather condition, wherein determining an autonomous or semi-autonomous policy for the road segment comprises determining an autonomous or semi-autonomous policy for the road segment based, at least in part, on the determined time of day or the weather condition.

19. The method of claim 14, further comprising:

determining a traffic level along the road segment in the direction of travel of the vehicle, wherein determining an autonomous or semi-autonomous policy for the road segment comprises determining an autonomous or semi-autonomous policy for the road segment based, at least in part, on the determined traffic level along the road segment.

20. The apparatus of claim 7, wherein road segment policy information is dynamically adjusted in response to a level of traffic on the road segment.

* * * * *